(12) United States Patent
Dorbie et al.

(10) Patent No.: US 6,466,223 B1
(45) Date of Patent: Oct. 15, 2002

(54) METHOD AND APPARATUS FOR TEXTURE MEMORY MANAGEMENT

(75) Inventors: Angus Dorbie; Christopher J. Migdal, both of Mountain View; Philippe G. Lacroute, Sunnyvale, all of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/275,725

(22) Filed: Mar. 24, 1999

(51) Int. Cl.$^7$ .................................................. G09G 5/40
(52) U.S. Cl. ......................... 345/582; 345/552; 345/557
(58) Field of Search ................................ 345/430, 418, 345/516, 513, 519, 429, 582, 583, 584, 587, 667, 689, 551, 552, 557, 588, 686, 564, 565

(56) References Cited

U.S. PATENT DOCUMENTS

| | | | |
|---|---|---|---|
| 5,056,044 A | * 10/1991 | Frederickson et al. | ...... 345/516 |
| 5,606,650 A | * 2/1997 | Kelley et al. | ............... 345/430 |
| 5,706,481 A | * 1/1998 | Hannah et al. | ............. 345/519 |
| 5,734,386 A | * 3/1998 | Cosman | ....................... 345/430 |
| 5,760,783 A | * 6/1998 | Migdal et al. | ............... 345/430 |
| 5,764,237 A | 6/1998 | Kaneko | ........................ 345/430 |
| 5,831,624 A | * 11/1998 | Tarolli et al. | ................ 345/430 |
| 5,838,332 A | * 11/1998 | Penna et al. | ................. 345/430 |
| 5,864,342 A | * 1/1999 | Kajiya et al. | ................ 345/418 |
| 6,002,407 A | * 12/1999 | Fadden | ........................ 345/430 |
| 6,104,415 A | * 8/2000 | Gossett | ........................ 345/513 |
| 6,111,584 A | * 8/2000 | Murphy | ....................... 345/430 |

FOREIGN PATENT DOCUMENTS

WO    WO 97/17676    5/1997    ........... G06T/15/50

OTHER PUBLICATIONS

James F. Blinn, "The Truth About Texture Mapping," *IEEE Computer Graphics and Applications,* Mar., 1990, 6 pages.
Demirer, et al., "Real Time Performance for Texture Mapping Using the Pim Map Technique in Hardware," *IEEE,* May 13, 1996, 4 pages.
PCT International Search Report in International Application No. PCT/US 00/07904, dated Jul. 6, 2000, 7 pages.

* cited by examiner

*Primary Examiner*—Matthew Luu
*Assistant Examiner*—Thu-Thao Havan
(74) *Attorney, Agent, or Firm*—Woodcock Washburn LLP

(57) ABSTRACT

A method and apparatus for efficiently managing texture memory in computer graphics systems is provided. Texture images are stored in discrete memory-aligned tiles to avoid fragmentation in the texture memory. Larger texture images are divided up into smaller tiles so that they will fit in any available tile region in texture memory. Small texture images usually fit into a single tile and therefore do not usually have to be divided up. Texture images that are larger than a tile region are split up into tile-sized images that are stored individually in any available tile region of texture memory. By dividing up the larger texture images this way, the texture memory is used more efficiently because any gaps that appear in the texture memory due to fragmentation may be filled by the tile-sized images.

24 Claims, 6 Drawing Sheets

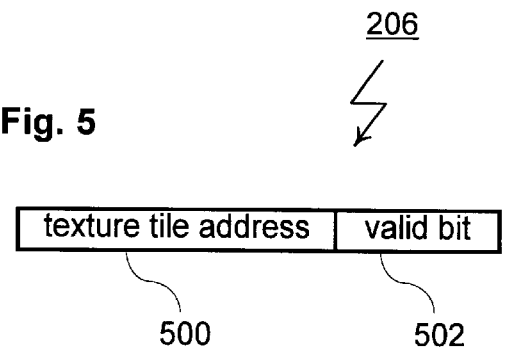
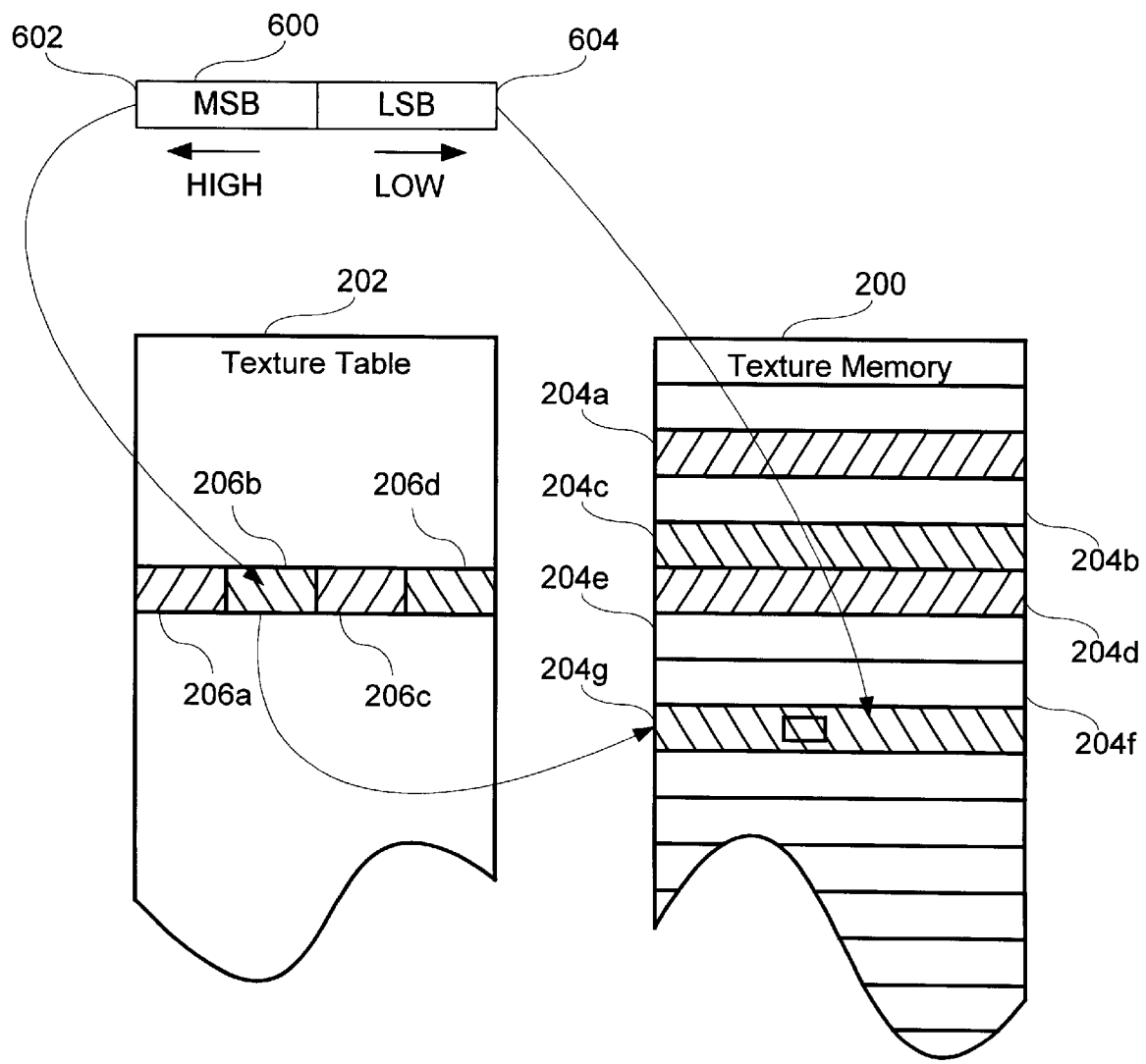

METHOD AND APPARATUS FOR TEXTURE MEMORY MANAGEMENT

FIELD OF THE INVENTION

This application relates generally to systems for computer graphics. More specifically, the present invention includes a method and apparatus for efficiently managing texture memory.

BACKGROUND OF THE INVENTION

Computer systems (and related devices) typically create three-dimensional images using a sequence of stages known as a graphics pipeline. During early pipeline stages, images are modeled using a mosaic-like approach where each image is composed of a collection of individual points, lines and polygons. These points, lines and polygons are know as primitives and a single image may require thousands, or even millions, of primitives. Each primitive is defined in terms of its shape and location as well as other attributes, such as color and texture.

The primitives used in early pipeline stages are transformed, during a rasterization stage, into collections of pixels. The rasterization stage is often performed by a specialized graphics processor (in low-end systems, rasterization may be performed directly by the host processor) and the resulting pixels are stored in a device known as a frame buffer. A frame buffer is a memory device that includes individual memory locations for each pixel.

During the rasterization stage, the graphics processor renders each primitive into the frame buffer. The graphics processor accomplishes this task by determining which frame buffer memory locations are included within the bounds of each primitive. The included memory locations are then initialized to reflect the attributes of the primitive, including color and texture.

Textures are the visual or tactile surface characteristics and appearance of an object. Depicting texture in a realistic manner is an important part of making three-dimensional images believable and is usually done by mapping texture images onto the primitives within an image. This process is known as texture mapping.

Texture mapping may be done by tiling one or more texture images over an area. To improve realism, a series of texture image tiles may be created to represent the texture at different distances away from the user's viewing point. The graphics system dynamically selects the correct texture from the series based on the distance to the eye point and viewing angle. The entire series is typically stored in a data structure known as a MIPmap. MiPmaps are pre-filtered, lower-resolution versions of a texture image.

Global texturing involves using a texture image that represents a large area. This texture image is created from image data such as satellite or aerial photographs. This global texture image is then mapped onto a surface image in order to provide the texture. Global texturing creates a type of photo realism that cannot be attained with traditional texturing methods.

Global textures may be quite large. As a result, these textures are usually subdivided and only the parts of the global texture image that are actually used in rendering an image are stored in texture memory. The rest is stored in main memory or on disk. As the point of view moves, the portion of the global texture image that is stored in texture memory is updated to reflect the new point of view.

One problem with some approaches to global texturing is texture memory fragmentation. Fragmentation occurs as portions of the global texture are paged into and out of the texture memory. Before the graphics system pages in a portion, it has to determine the portion's size. Then the graphics system must determine whether there is a large enough space available in the texture memory. If there is space available, the system may page in that portion. If not, then it will have to page another portion out of the texture memory before paging in the new portion from disk. As more portions are paged in and out, gaps start to form in texture memory. This makes it more difficult for the graphics system to find suitably sized spaces in the texture memory to page in more portions of the global texture.

Another problem occurs when the graphics system accesses portions of the global texture from disk in rapid succession. First, the graphics system has to determine the size of the portion. Then it has to find a large enough space in the texture memory before it can page in that portion from disk. This slows down the rate at which the graphics system can page the data into and out of the texture memory.

Thus, a need exists for an efficient method for managing texture memory that deals effectively with large homogenous texture image datasets. This need is especially important for simulation environments, such as flight simulators and for highly realistic virtual reality systems.

SUMMARY OF THE INVENTION

An embodiment of the present invention includes a method and apparatus for efficiently managing texture memory in computer graphics systems. For the method of the present invention, all of the texture images are stored in discrete memory-aligned tiles. Storing the texture images into memory-aligned tiles helps to avoid fragmentation in the texture memory.

With this method, larger texture images are divided up into smaller tiles so that they will fit in any available tile region in texture memory. Small texture images usually fit into a single tile and therefore do not usually have to be divided up. Texture images that are larger than a tile region are split up into tile-sized images that are stored individually in any available tile region of texture memory. By dividing up the larger texture images this way, the texture memory is used more efficiently because any gaps that appear in the texture memory due to fragmentation may be filled by the tile-sized images.

This method requires that the graphics system keep track of the location of each of the tiles in texture memory. This makes paging the data into and out of the texture memory more efficient. The locations of the each of the tiles is stored in an address table in memory.

In one embodiment of the invention, the address table may also contain an address value that indicates that a texture image has no information for a particular MIP level. For example, a tile with no texture data could have an "empty" address in the relevant address table entry. This indicator could then direct the texture fetch to another MIP level by simple bit manipulation.

This indicator may also be used for freeing an existing tile in texture memory. This is done by marking the texture table address pointing to the tile location as "empty" and then directing the texture fetch to the next level of available MIP. The texture memory tile is then made available for other textures to use.

To introduce a new data tile into texture memory, the system can page data to a free tile in texture memory. This data may be paged into the texture memory even while the texture image is being used. Once the data is in texture memory, the address table is updated and the graphics system may access the newly paged data immediately.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 5 is a block diagram of a texture table entry as used by an embodiment of the present invention.

FIG. 6 is a block diagram of the address resolution technique as used by an embodiment of the present invention.

DETAILED DESCRIPTION OF THE PREFERRED EMBODIMENTS

Reference will now by made in detail to preferred embodiments of the invention, examples of which are illustrated in the accompanying drawings. Wherever convenient, the same reference numbers will be used throughout the drawings to refer to the same of like parts.

Environment

Figure 1:
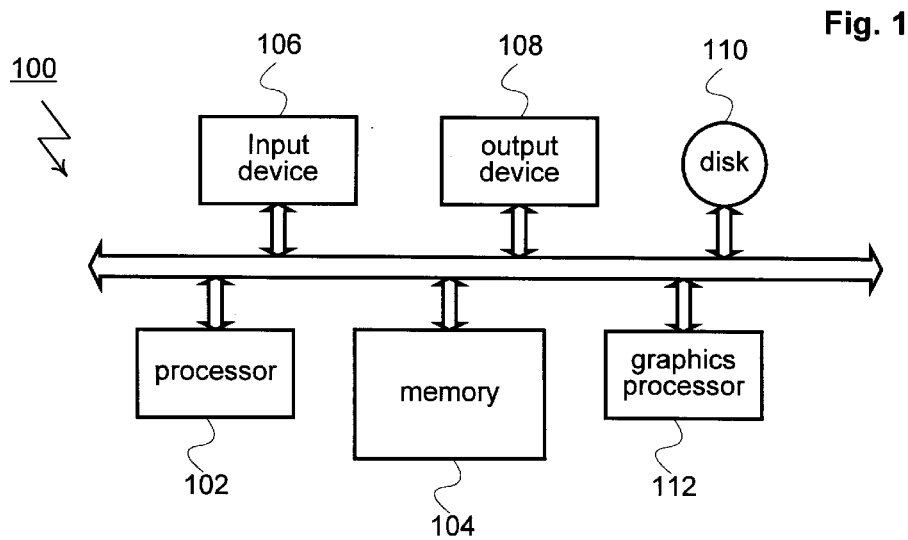
FIG. 1 shows an example of a computer system on which an embodiment of the present invention may be implemented.

In FIG. 1, a computer system 100 is shown as a representative environment for the present invention. Structurally, computer system 100 includes a processor, or processors 102, and a memory 104. An input device 106 and an output device 108 are connected to processor 102 and memory 104. Input device 106 and output device 108 represent a wide range of varying I/O devices such as disk drives, keyboards, modems, network adapters, printers and displays. Each node 102 may also includes a disk drive 110 of any suitable disk drive type (equivalently, disk drive 110 may be any non-volatile mass storage system such as "flash" memory). Computer system 100 also preferably includes a graphics processor 112 of any suitable type. Graphics processor 112 implements all of the tasks required to translate graphics primitives and attributes to displayable output.

Texture Memory Management

Figure 2:
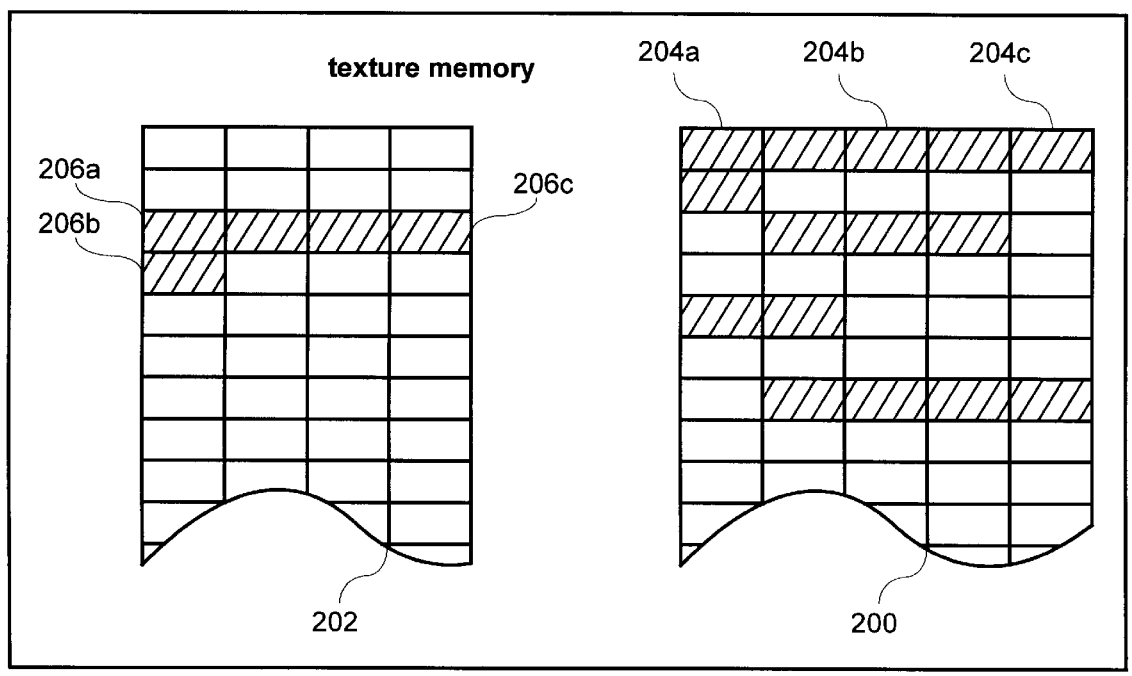
FIG. 2 is a block diagram of the texture memory and texture table as used by an embodiment of the present invention.

The present invention includes a method and apparatus for efficiently managing texture memory in computer systems. As shown in FIG. 2, the present invention typically subdivides memory 104 to include a texture memory 200 and a texture table 202. Texture memory 200 is subdivided into a series of equal sized memory tiles, of which tiles 204a through 204c are representative. Memory tiles 204 have a fixed size. This size may vary between implementations and is preferably runtime configurable. Typical memory tiles 204 sizes range from $16^2$ to $256^2$ images samples.

Memory tiles 204 are used to store textures for graphics processor 112. Large textures, such as global textures, are subdivided into texture tiles. Each texture tile is the same size as a memory tile 204. Texture tiles are accessed by loading them into memory tiles 204. The series of memory tiles 204 used to store a large texture may be stored contiguously, or may be dispersed within texture memory 200. Textures that are smaller than the size of memory tiles 204 may be grouped and stored two or more to a memory tile 204.

Texture table 202 includes a series of texture table entries, of which texture table entries 206a through 206c are representative. Each texture table entry 206 corresponds (when initialized) to one of the memory tiles 204 within texture memory 200. Processor 102 uses texture table entries 206 as a mapping between texture tiles and memory tiles 204.

Figure 3:
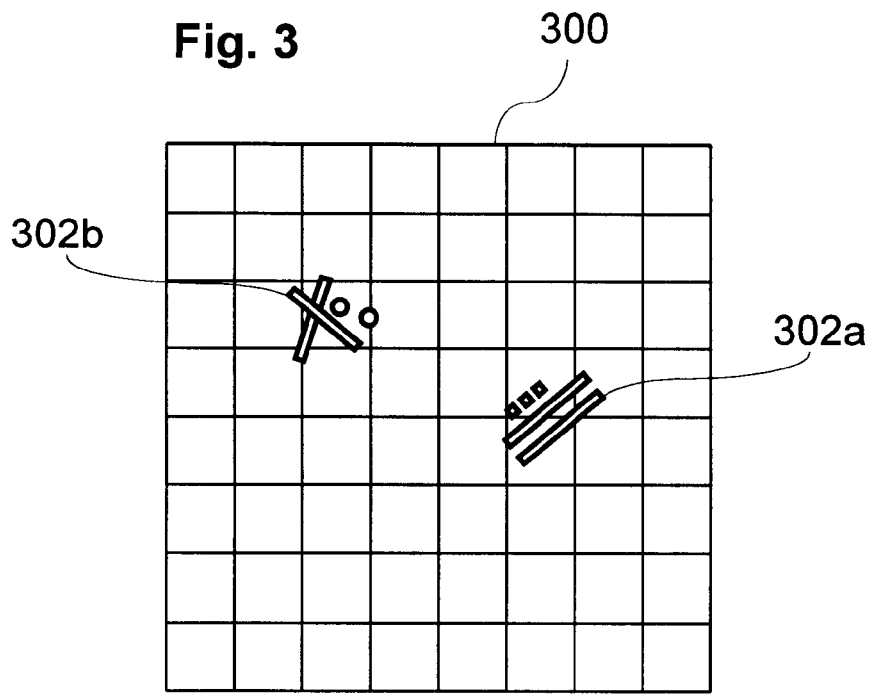
FIG. 3 is a diagram of a representative image shown as an example usage of an embodiment of the present invention.
Figure 4A:
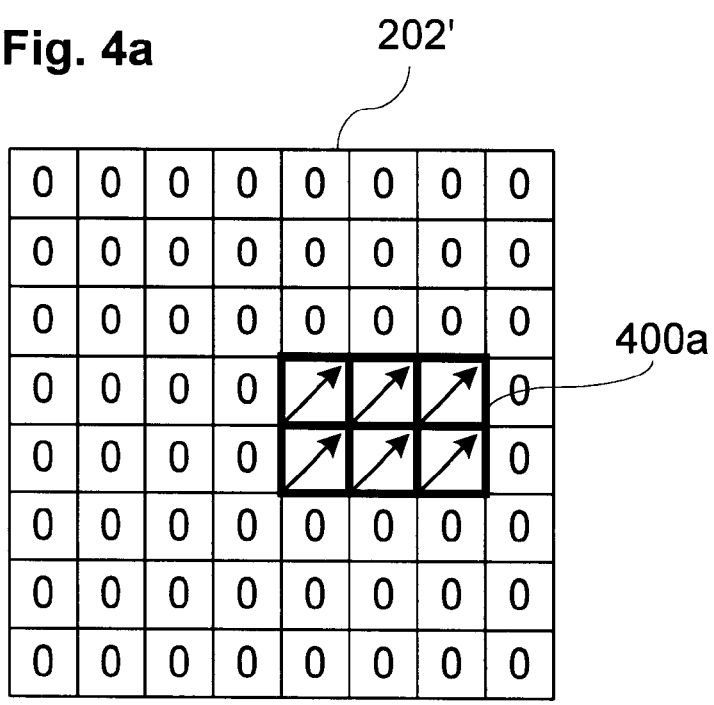
FIG. 4a is a block diagram of a texture table corresponding to portions of the image of FIG. 3.

As an example, FIG. 3 shows a simple image 300 that includes airfields 302a and 302b. For the purposes of this example, it is assumed that image 300 is spanned by a global texture. The global texture is subdivided into a series of fixed size texture tiles. The texture tiles are represented by the grid that appears in image 300. FIG. 4a shows a representative texture table 202' that corresponds to the case where processor 102 has focused on rendering airfield 302a. To render this portion of image 300, processor 102 has retrieved or generated the texture tiles that corresponds to airfield 302a. Each of these texture tiles has been loaded into a memory tile 204. Processor 102 has initialized the texture table entries 206 that correspond to the memory tiles 204 that have been loaded in texture memory 202. This group of texture table entries 206 is designated 400a in FIG. 4a. After this initialization, processor 102 may use texture table 206' to access the memory tiles 204 (and their texture tiles) for airfield 302a.

Figure 4B:
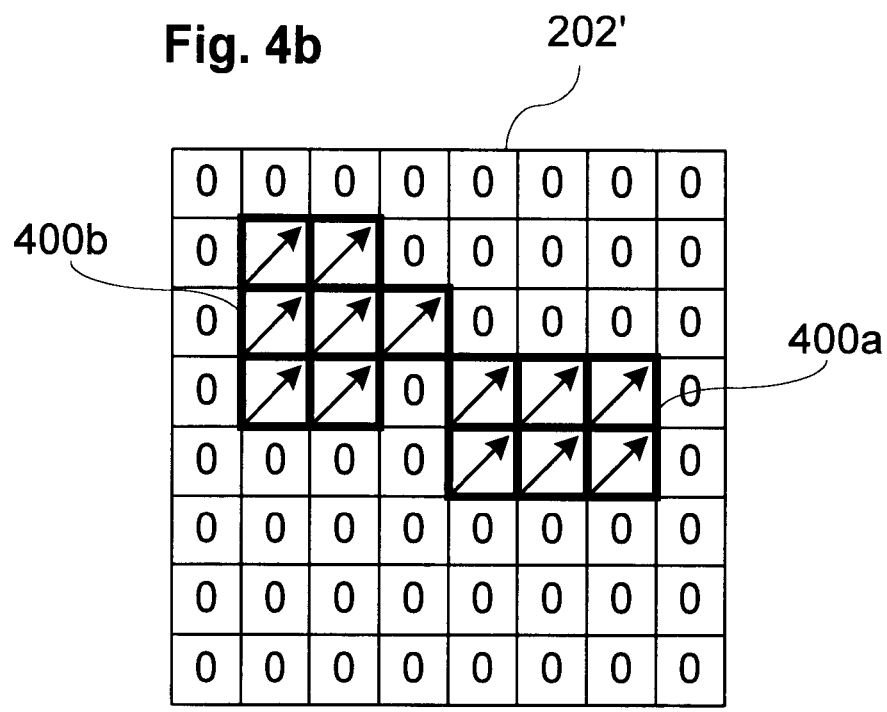
FIG. 4b is a block diagram of a texture table corresponding to additional portions of the image of FIG. 3.

FIG. 4b continues this example by showing the texture table 202'0 after it has been updated to render airfield 302b. To render this portion of image 300, processor 102 has retrieved or generated the texture tiles that corresponds to airfield 302b. Processor 102 has loaded these texture tiles into memory tiles 204 and initialized the corresponding texture table entries 206. The group of texture table entries 206 that correspond to the memory tiles 204 (and their texture tiles) for airfield 302b is designated 400b in FIG. 4b.

Figure 4C:
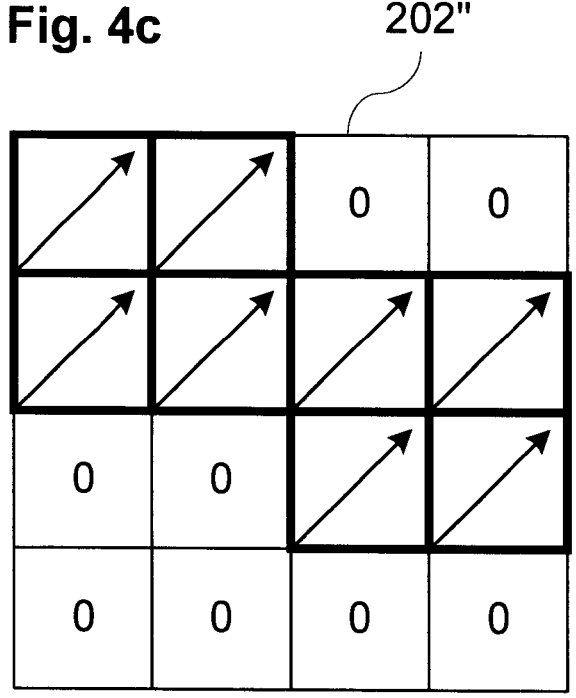
FIG. 4c is a diagram of texture table at lower resolution over same area as 4b but with more geographic coverage.

FIG. 4c repeats the airfield example of FIG. 4b. In this case, however, texture table 202" corresponds to the next MIP level for the global texture of FIG. 3. The next level of MIP means that each texture tile includes lower resolution data that spans a greater portion of the underlying image. For this reason, texture table 202" contains fewer initialized texture table entries 206 and still covers the same region of interest as described for FIG. 4b.

The preceding examples are intended to illustrate the use of the present invention as a flexible mechanism for managing texture memory. Processor 102 can use the described methods to page texture tiles into texture memory 200. Texture table 202 allows processor 102 to subsequently locate and access the texture tiles within their memory tiles 204 in texture memory 202. The groups 400a and 400b of texture table entries 206 illustrate how texture table 202 may be used to define a region of interest within an image (i.e., an area for which the corresponding texture tiles are resident in texture memory 200). Processor 102 can move, split or reshape the region of interest by paging texture tiles into texture memory 200 and updating texture table 202. Movement of the region of interest may be accomplished by updating texture table entries 206 at the leading and trailing edges of the region of interest. This means that texture table entries 206 within the interior of the region of interest do not need to be changed.

This mechanism for managing texture memory is particularly useful for managing global textures. The region of interest approach means that extremely large global textures can be accessed using discrete texture tiles. Only the particular tiles that are required need to be paged into texture memory 200.

As described above, each texture table entry 206 is used to record the existence and location of a corresponding memory tile 204. This type of utility can be achieved using any one of several different implementations for texture table entries 206. For one such implementation, show in FIG. 5, each texture table entry 206 is subdivided to include a memory tile address 500 and a valid bit 502. Memory tile address 500 is used to point to the starting address of a corresponding memory tile 204. For a typical embodiment, memory tiles 204 will be aligned to start on addresses that are modulo zero of the size of memory tiles 204. For example, if each memory tile 204 is defined to include M bytes, then each memory tile 204 would start on an address that is evenly divisible by M. This means the $\log_2 M$ least significant bits in the address of a memory tile 204 will always be zero. For this reason, these bits are not typically stored in memory tile address 500. This decreases the overall size required for memory tile address 500 and texture table entry 206.

Valid bit 502 is set to indicate that memory tile address 500 has been initialized. Thus, by examining the state of valid bit 502, it is possible to determine if memory tile address 500 contains the address of a memory tile 204. In some embodiments, valid bit 502 may be eliminated by using a reserved address, such as zero, for uninitialized texture table entries 206. For embodiments of this type, memory tile address 500 is set to the reserved value to indicate that texture table entry 206 is uninitialized.

Figure 7:
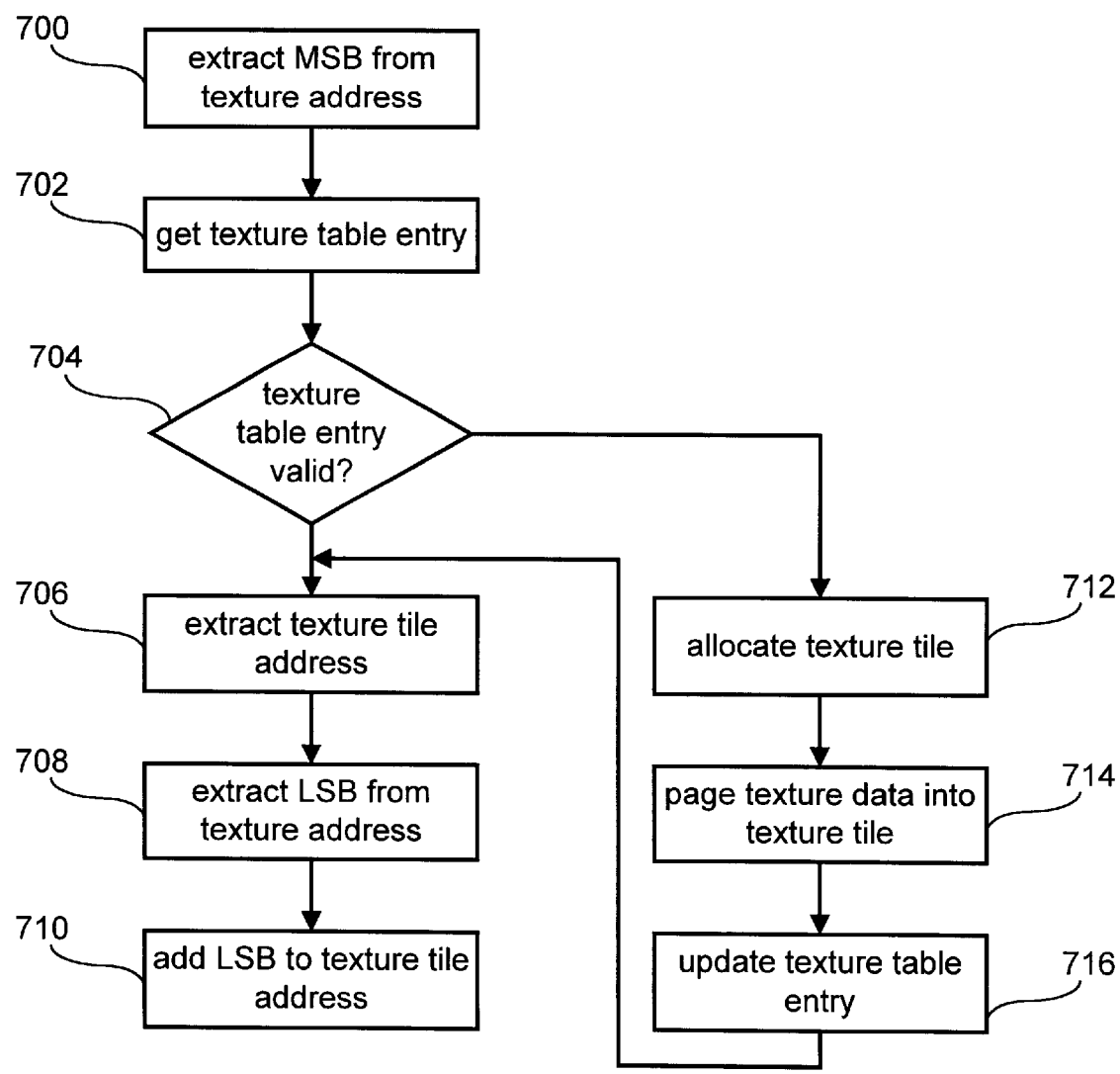
FIG. 7 is a flowchart showing the steps associated with the address resolution method as used by an embodiment of the present invention.

Processor 102 may use various methods to address texture table entries 206 and their corresponding memory tiles 204. One such method, shown in FIG., 6 is to use a texture address 600 split into a most significant bits (MSB) portion 602 and a least significant bits (LSB) portion 604. The sizes of MSB portion 602 and LSB portion 604 are implementation dependent. In the case of LSB portion 604 this implementation detail is controlled by the size of memory tiles 204, with each LSB portion 604 having $\log_2 M$ bits (where M is the defined as the number of bytes in each memory tile 204). The size of MSB portion 602 controls the number of memory tiles 204 that can be addressed. MSB portion 602 functions as an offset into texture table 202 and identifies the texture table entry 204 that corresponds to texture address 600. LSB portion 604 functions as an offset into that memory tile 204 and identifies the particular address in texture memory 200 that corresponds to texture address 600, The resolution of texture address 600 using MSB portion 602 and LSB portion 604 may be better understood by reference to Method 700 of FIG. 7. In step 700 of Method 700, processor 102 extracts the MSB portion 602 of texture address 600. Processor 102 performs this step using appropriate bit-wise operations including, where appropriate, shift and masking operations. In step 702, processor 102 uses the MSB portion 602 extracted in step 700 to retrieve a texture table entry 206 from texture table 202. For a typical embodiment, processor 102 performs this task by adding the MSB portion 602 extracted in step 700 to a base address for texture table 202. Processor 102 then retrieves the texture table entry 206 indexed by the sum of the base address and MSB portion 602.

In step 704, processor 102 determines if the memory tile address 500 within the retrieved texture table entry 206 is valid. As discussed previously, processor 102 makes this determination using valid bit 502. Alternately, when valid bit 502 is not provided, processor 102 compares memory tile address 500 to a reserved address such as zero or NULL.

If the memory tile address 500 is valid, processor 102 continues Method 700 at step 706. In step 706, processor 102 extracts the memory tile address 500 from the retrieved texture table entry 206. In step 708, processor 102 extracts the LSB portion 604 of texture address 600. Processor 102 performs this step using appropriate bit-wise operations including, where appropriate, shift and masking operations. In step 710, processor 102 adds the extracted LSB portion 604 to the memory tile address 500. The combination of the LSB portion 604 and the memory tile address 500 is the resolved texture address within texture memory 200.

Processor 102 reaches step 712 when it has been determined (in step 704) that memory tile address 500 is not valid. In step 712, processor 102 allocates a new memory tile 204 in texture memory 200. In many cases, processor 102 may be able to acquire an unused memory tile 204. In other cases, processor 102 will have to reuse a memory tile 204 that has already been used. In this later case, processor 102 reuses a memory tile 204 by invalidating any texture table entries 206 that correspond to the reused memory tile 204. Typically, processor 102 will select a particular tile 204 for reuse using some sort of least recently used (LRU) replacement strategy. In other cases, processor 102 will be able to make intelligent choices when selecting a memory tile 204 for reuse. For example, in cases where a region of interest is being scrolled or otherwise moved, processor 102 may reuse memory tiles 204 from the trailing (or scrolled away from) edge of the region of interest.

In step 714 processor 102 retrieves or generates the texture tile that corresponds to texture address 600. In many cases, such as when performing global texturing, the texture tile will be retrieved or paged from disk. Processor 102 places the texture tile in the selected memory tile 204.

In step 716 processor 106 updates the texture table entry 206 that corresponds to MSB portion 602 to reflect the address of the memory tile selected in step 712. Processor 102 also sets valid bit 502 to reflect the fact that the texture table entry 206 now corresponds to a memory tile 204. Processor 102 then continues Method 700 at step 706 to fully resolve texture address 600.

In general, the generation of this texture will be performed by specialized graphics hardware. As part of this generation, processor 102 will allocate a memory tile 204 within texture memory 200. Processor 102 will then update the retrieved texture table entry 206 to correspond to the new memory tile 204.

In the description of Method 700, processor 102 performs a type of demand paging for texture tiles. In general, it should be appreciated that demand paging is only one option and that other paging strategies may be used in place of or in combination with Method 700. For example, it is entirely possible for processor 102 to predict many future texture requirements. The paging process for these textures may be started ahead of time and allowed to complete asynchronously. This increases the chances that a desired texture tile will be resident in texture memory 200 when it is actually needed. In addition load balancing can be tightly controlled in conjunction with the MIP alternative scheme described below.

Support For Varying Mip Levels

In some cases, it is useful to configure the present invention to provide a form of enhanced support for varying MIP levels. This allows certain portions of an image to be represented at a first MIP level while other portions are represented at higher or lower resolutions. In other cases, a single region will be represented at more than one MIP level. This allows lower resolution textures to be accessed quickly or higher resolution textures to be accessed as time and bandwidth allow. In cases where bandwidth is low or time is short, low resolution textures can be accessed and paged to fill large screen areas. In cases where more bandwidth of time is available, higher resolution textures can be paged into texture memory 200.

Figure 8:
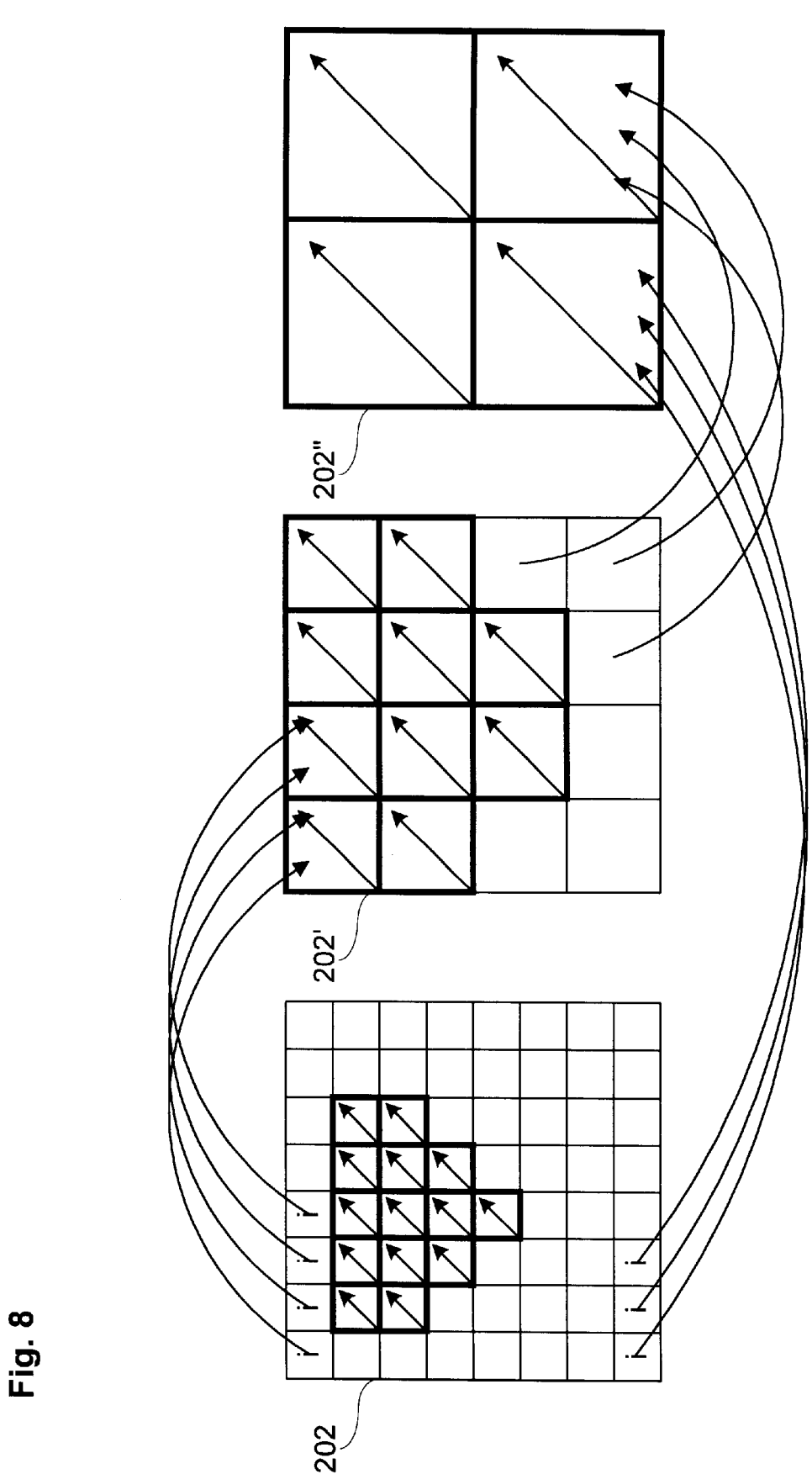
FIG. 8 is a block diagram of an extended address resolution technique as used by an embodiment of the present invention.

FIG. 8 shows one method for providing this type of support. In FIG. 8, texture tables 202, 202' and 202" each include one more direct texture table entries 206 (marked with a symbolic short straight arrow). The direct texture table entries 206 of texture tables 202, 202' and 202" point to memory tiles 204 containing high, medium and low resolution texture data, respectively. In general, it should be appreciated that the division between texture tables 202, 202' and 202" is logical. These structures may all be part of the same entity.

The direct texture table entries in texture tables 202, 202' and 202" may be used to access high, medium and low resolution textures. This allows textures of appropriate resolution to be rapidly accessed, based on bandwidth or other requirements. Texture tables 202 and 202' also include indirect texture table entries 206 (marked with a symbolic i). These entries do not point at memory tiles 204. Instead, the indirect texture table entries 206 point at other texture table entries 206. A texture table entry 206 that points to another texture table entry 206 does not directly resolve to a memory tile 204. Instead, a texture table entry 206 of this type resolves (through one or more levels of indirection) to a memory tile 204 having containing a lower resolution texture (a texture having a higher MIP level). Support of this type is especially valuable if Method 700 is modified to traverse these chains of texture table entries 206 when paging textures (see steps 712 through 716 of Method 700).

The use of indirect texture table entries 206 provides a type of built-in mapping between texture addresses and MIP levels. A given address is resolved to a texture table entry 206. If no texture exists at that MIP level, the address resolves to a subsequent texture table entry 206. This process is repeated through subsequently lower resolution textures until the method is exhausted or a suitable texture is located.

Other embodiments be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for managing a graphics texture, comprising:
   subdividing a texture into one or more texture tiles, wherein each of the one or more texture tiles has a fixed texture tile size;
   allocating one or more memory tiles within a texture memory corresponding to the texture tiles, wherein each of the one or more memory tiles has a fixed memory tile size that is based on the fixed texture tile size;
   paging each texture tile into a corresponding memory tile;
   defining a texture table in the texture memory, the texture table having one or more texture table entries; and
   initializing a respective texture table entry in the texture table for each memory tile, the texture table entry operable to identify a respective memory tile address of each memory tile associated with the texture.

2. The method of claim 1, wherein initializing a texture table entry includes setting a memory tile address in the texture table entry to be equal to a starting address of the memory tile.

3. The method of 1, wherein initializing a texture table entry includes setting a valid bit within the texture table entry to indicate that the texture table entry is initialized.

4. The method of 1, further comprising:
   subdividing a texture address to create a most significant bits portion and a least significant bits portion;
   using the most significant bits portion to retrieve the texture table entry from the texture table;
   determining if the texture table entry includes a valid memory tile address; and
   combining the least significant bits portion and the memory tile address in response to the texture table entry including a valid memory tile address.

5. The method of claim 4, wherein determining if the texture table entry includes a valid memory tile address includes testing a state of a valid bit within the texture table entry.

6. The method of claim 1, wherein the memory tile is allocated using a fixed size and alignment.

7. The method of claim 1, wherein the fixed memory tile size is the same as the fixed texture tile size.

8. A method for managing a graphics texture, comprising:
   subdividing a texture into one or more texture tiles, wherein each of the one or more texture tiles has a fixed texture tile size;
   defining a region of interest within an image;
   paging a set of texture tiles that correspond to the region of interest into a texture memory, wherein the texture memory includes one or more memory tiles that correspond to the texture tiles, and each of the one or more memory tiles has a fixed memory tile size that is based on the fixed texture tile size; and
   storing a respective location of each texture tile into a texture table of the texture memory.

9. The method of claim 8, wherein the texture memory is subdivided into a series of fixed size memory tiles.

10. The method of claim 9, wherein paging a set of texture tiles includes:
    selecting, for each texture tile in the set of texture tiles, a corresponding memory tile; and
    loading each texture tile in the set of texture tiles into its corresponding memory tile.

11. The method of claim 10, wherein paging a set of texture tiles includes:
    initializing, for each texture tile in the set of texture tiles, an entry in the texture table, each texture table entry including a mapping between a texture tile and the corresponding memory tile.

12. The method of claim 8, further comprising:

moving the region of interest within the image; and paging one or more additional texture tile s in to the texture memory to reflect t he movement of the region of interest.

13. The method of claim 12, wherein paging one or more additional texture tiles is initiated before moving the region of interest.

14. The method of claim 12, wherein at least some texture tiles include a lower resolution texture and wherein paging one or more additional texture tiles into the texture memory includes:

selecting a texture resolution to be paged.

15. The method of claim 14, wherein selecting the texture resolution to be paged is based on a bandwidth available to page texture tiles.

16. A computer program product comprising a computer usable medium having computer readable code embodied therein, the computer readable code configured to perform a method for managing a graphics texture, the method comprising:

subdividing a texture into one or more texture tiles, wherein each of the one or more texture tiles has a fixed texture tile size;

defining a region of interest within an image;

paging a set of texture tiles that correspond to the region of interest into a texture memory, wherein the texture memory includes one or more memory tiles that correspond to the texture tiles, and each of the one or more memory tiles has a fixed memory tile size that is based on the fixed texture tile size; and storing a respective location of each texture tile into a texture table of the texture memory.

17. The computer program product of claim 16, wherein the texture memory is subdivided into a series of fixed size memory tiles.

18. The computer program product of claim 17, wherein paging the set of texture tiles includes:

selecting, for each texture tile in the set of texture tiles, a corresponding memory tile; and loading each texture tile in the set of texture tiles into its corresponding memory tile.

19. The computer program product of claim 18, wherein paging the set of texture tiles includes:

initializing, for each texture tile in the set of texture tiles, an entry in the texture table, each texture table entry including a mapping between a texture tile and the corresponding memory tile.

20. The computer program product of claim 16, further comprising:

moving the region of interest within the image; and paging one or more additional texture tiles into the texture memory to reflect the movement of the region of interest.

21. The computer program product of claim 20, wherein paging one or more additional texture tiles is initiated before moving the region of interest.

22. The computer program product of claim 20, wherein at least some texture tiles include a lower resolution texture and wherein paging one or more additional texture tiles into the texture memory includes:

selecting a texture resolution to be paged.

23. The computer program product of claim 22, wherein selecting the texture resolution to be paged is based on a bandwidth available to page texture tiles.

24. A computer program product comprising a computer usable medium having computer readable code embodied therein, the computer readable code configured to perform a method for managing a graphics texture, the method comprising:

subdividing a texture into one or more texture tiles, wherein each of the one or more texture tiles has a fixed texture tile size;

allocating one or more memory tiles within a texture memory corresponding to the texture tiles, wherein each of the one or more memory tiles has a fixed memory tile size that is based on the fixed texture tile size;

paging each texture tile into a corresponding memory tile;

defining a texture table in the texture memory, the texture table having one or more texture table entries; and initializing a respective texture table entry in the texture table for each memory tile, the texture table entry operable to identify a respective memory tile address of each memory tile associated with the texture.

\* \* \* \* \*

UNITED STATES PATENT AND TRADEMARK OFFICE
CERTIFICATE OF CORRECTION

PATENT NO.   : 6,466,223 B1
DATED        : October 15, 2002
INVENTOR(S)  : Dorbie et al.

It is certified that error appears in the above-identified patent and that said Letters Patent is hereby corrected as shown below:

Column 1,
Line 52, please delete "MiPmaps" and insert therefor -- MIPmaps --;

Column 2,
Line 50, please delete the word "the";

Column 3,
Line 47, please delete "by" and insert therefore -- be --;
Line 61, please delete "includes" and insert therefor -- include --;

Column 9,
Line 3, please delete "tile s in to" and insert therefor -- tiles into --;
Line 4, please delete "t he" and insert therefor -- the --.

Signed and Sealed this

Twenty-ninth Day of July, 2003

JAMES E. ROGAN
*Director of the United States Patent and Trademark Office*